United States Patent
Hewlett et al.

(10) Patent No.: US 6,573,951 B1
(45) Date of Patent: Jun. 3, 2003

(54) NON-TERMINATING PULSE WIDTH MODULATION FOR DISPLAYS

(75) Inventors: Gregory J. Hewlett, Blue Bell, PA (US); Donald B. Doherty, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/413,582

(22) Filed: Oct. 6, 1999

Related U.S. Application Data

(60) Provisional application No. 60/103,704, filed on Oct. 9, 1998.

(51) Int. Cl.[7] .............................. H04N 5/74; H04N 9/12
(52) U.S. Cl. ....................... 348/770; 348/742; 348/759; 345/691
(58) Field of Search ................................. 348/742, 743, 348/750, 759, 770, 771; 345/84, 88, 89, 691, 692, 693; H04N 5/74, 9/12

(56) References Cited

U.S. PATENT DOCUMENTS

| | | | | |
|---|---|---|---|---|
| 5,278,652 A | * | 1/1994 | Urbanus et al. ............. 348/743 |
| 5,592,188 A | | 1/1997 | Doherty et al. .............. 345/84 |
| 5,657,099 A | * | 8/1997 | Doherty et al. ............. 348/743 |
| 5,774,196 A | * | 6/1998 | Marshall ..................... 348/743 |
| 6,002,452 A | * | 12/1999 | Morgan ....................... 348/742 |
| 6,008,785 A | | 12/1999 | Hewlett et al. ............... 345/85 |
| 6,034,660 A | * | 3/2000 | Millward et al. ............. 345/84 |
| 6,115,083 A | * | 9/2000 | Doherty et al. ............. 348/771 |
| 6,201,521 B1 | * | 3/2001 | Doherty ....................... 345/84 |
| 6,226,054 B1 | * | 5/2001 | Morgan et al. ............. 348/759 |

* cited by examiner

*Primary Examiner*—John Miller
*Assistant Examiner*—Brian Yenke
(74) *Attorney, Agent, or Firm*—Charles A. Brill; Wade James Brady, III; Frederick J. Telecky, Jr.

(57) ABSTRACT

A method for using pulse-width modulation in displays. A series of PWM sequences is established. Each subsequent sequence clears the previous sequence before it, eliminating the need for a separate clearing reset at the end of the previous sequence. This allows for use of spoke bits in color-sequential systems. In non-color sequential systems and rapid color-switching systems it allows the sequence for one frame to flow directly into the sequence for the next frame.

6 Claims, 2 Drawing Sheets

NON-TERMINATING PULSE WIDTH MODULATION FOR DISPLAYS

This application claims priority under 35 USC §119(e)(1) of provisional application No. 60/103,704 filed Oct. 9, 1998.

BACKGROUND OF THE INVENTION

1. Field of the Invention

This invention relates to pulse width modulation for displays, more particularly for non-terminating sequences for these displays.

2. Background of the Invention

Spatial light modulator (SLM) displays utilize light transmitted or reflected by individual elements. The light transferred to the display surface form a viewable image. Digital SLMs typically receive the data for each element as a predetermined number of bits. More bits of data result in a more accurate representation of the picture element (pixel). The human eye has an analog response, so the digital data represents the analog value of any pixel. Higher numbers of bits give a better representation.

The elements transfer light for each bit of data, which the eye integrates into a given intensity. Use of 8 bits of data results in 256 gray shades. Each of the 8 bits, for example, can have the value of either a 1 or a 0. The element transfers light to the final imaging plane when the data is a 1, and does not transfer light when the data is a 0, although some systems use the reverse.

The significance of the bit determines the amount of time given to that bit to transfer or not transfer light. When the image is sampled for digitization, the information is coded into the data for each element by bit significance. The most significant bit (MSB) receives approximately half of the time allocated for that data, with each lesser significant bit receiving halves of the time allocated to its next most significant bit (i.e., values would be approximately ½, ¼, ⅛, 1/16, etc.). The sequence results in a series of light pulses for varying times that the eye integrates into a dot of a certain intensity.

These systems add color with the use of color filters or colored light sources. In a color-sequential system, typically only one device is used with an arrangement that changes the color of the light striking the device either with color filters or colored light sources. The same number of bits represents each color, and the eye integrates the images into a color image. Color filters can be implemented in several ways. A typical implementation uses color wheel rotating in front of the light source.

Most color wheels have three segments, red, green and blue, although variations exist. As each segment moves between the light source and the SLM, data for that color segment is used. Currently, PWM sequences, such as those described above, stand independently of previous or subsequent sequences. The device clears its data at the end of one sequence and prior to the next sequence. No light is transferred to the image plane during this clearing time. This wastes time that could be used to transfer light, which would raise the image brightness, as well as causing other problems.

Therefore, a method of addressing digital SLMs for display is needed that eliminates this independence between sequences, making the sequences seamless and allow utilization of time that would otherwise have been wasted.

SUMMARY OF THE INVENTION

One embodiment of the present invention is a method to operate a digital spatial light modulator (SLM) display using pulse-width modulation (PWM) in which the sequences of PWM are sequentially linked. The start of a new sequence of PWM terminates the previous sequence, rather than the previous sequence being terminated prior to the start of the new sequence as was done prior to this invention.

The new sequence of PWM could be the start of a different color in color-sequential systems, or the start of the next video frame.

It is an advantage of the invention in that it eliminates any off time of the device, allowing better utilization of the light, producing brighter images.

It is a further advantage of the invention in that it has flexibility to allow the use of different types of sequential color light sources.

It is a further advantage of the invention in that it allows use of other PWM related techniques.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE PREFERRED EMBODIMENTS

Figure 1:
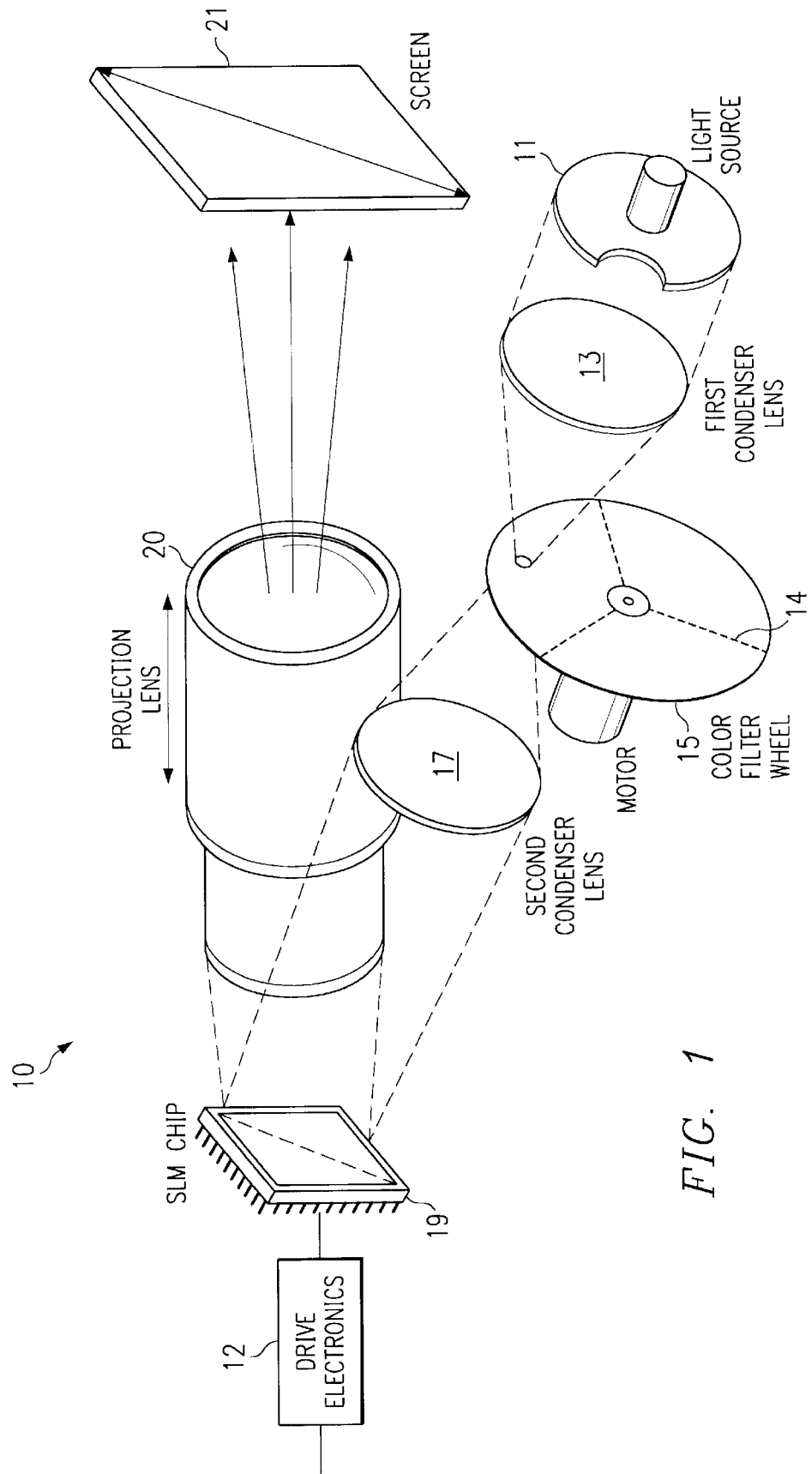
FIG. 1 is a system diagram of a color-sequential display system using an SLM.

FIG. 1 shows one example of a color-sequential display system. A color-sequential display system is merely one of several examples of systems in which this invention could be used. This example is in no way intended to limit the scope of this invention.

The system 10 comprises a light source 11, which illuminates a spatial light modulator (SLM) 19 through a first condenser lens 13 a color wheel 15 and a second condenser lens 17. The SLM 19 produces an image by modulating the light by means of signals received from drive electronics 12. Note that this example assumes a reflective SLM. However this invention applies to both reflective and transmissive SLMs. The modulated image is transferred to screen 21 via lens 20.

Color wheel 15 typically has three filter segments, one each of red, green and blue. As the wheel rotates, the light illuminating SLM 19 becomes colored by whichever color filter is currently in the light path. The transition points between the colors, such as that at 14, cause the SLM to be illuminated by both colors until the transition passes. This transition point is commonly referred to as a spoke.

Figure 2:
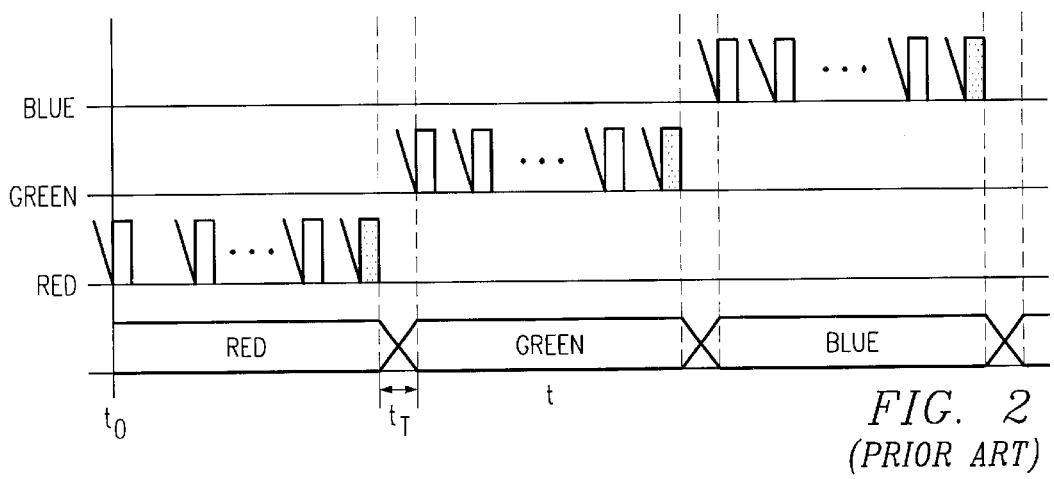
FIG. 2 is a prior art embodiment of a timing diagram used for PWM sequences.

In current digital SLM systems, the data is displayed using a technique called pulse-width modulation, as was described before. Current practice keeps all sequences independent of one another. The term sequence as used herein identifies the programmed series of PWM pulses for a predetermined time segment. The segments could be colors, as in the color-sequential example above, or frames of data. The independent sequences of the prior art are shown in FIG. 2.

A color-sequential system is used for purposes of discussion. The bottom line of the timing diagram shows the color output, red, green and then blue. Obviously, the sequences of the three colors can occur in whatever order the designer desired. At the far left of the diagram at to, the first bit of data for the RED line is activated on the device.

It is helpful to discuss the specifics of a SLM at this point. For purposes of example and illustration only, the discussion will assume that the modulator being used is a Digital Micromirror Device™ (DMD). These devices comprise a mirror suspended above a substrate on hinges that allow it to deflect to one side or the other. Which side it deflects towards depends upon the data activating the device. Data activates the device by being loaded on two addressing electrodes on the substrate over which the mirror is suspended.

If the data is a 1, the voltages on the addressing electrodes are controlled to cause the mirror to deflect to the side that allows it to reflect light to an image surface, such as a screen. If the data is a 0, the mirror deflects to the other side. When the mirror deflects it lands on landing electrode and is latched into place electrically by control of the voltage. While the mirror is in that position, effectively displaying (or not displaying) the data bit, new data is loaded onto its activation circuitry. When the time interval for the currently displayed data ends, the mirror is reset, which allows it to release from its current position and assume the proper position for the next bit of data, already loaded.

Using this example as a basis for a more general application, activation of the data means the generation of a signal causing the elements to react to the data for its next state. This will be referred to as the reset pulse or resetting the device.

The diagonal line on the RED line prior to $t_0$ indicates the load of the new data for the first RED PWM bit. The reset pulse that occurs at the start of the RED sequence causes the elements to assume the appropriate state for that bit. The appropriate number of these reset pulses are used during the course of the RED sequence to allow whatever number of bits of RED data used to be loaded and displayed. Just prior to the end of the RED sequence, the device is cleared.

Clearing the device typically involves loading data corresponding to the OFF state and resetting the device. The elements assume their OFF state during the period when the light is of both colors on either side of the color wheel spoke. The period of time when the light is of mixed colors will be referred to as the transition time, $t_T$. The reset pulse that causes all elements to turn OFF is shown as a solid pulse on the timing diagram.

During the transition time the data for the first pulse of the next sequence is loaded. At the end of the transition time, when the light is now again monochrome, the device resets and the elements respond to their new data. This is seen on the timing diagram during the transition period between RED and GREEN. At the end of the GREEN sequence, a reset pulse again clears the device. During the next transition time, the data for the next color, blue, is loaded and the reset for the beginning of the BLUE sequence occurs.

Several problems with this approach have occurred. First, a method exists for using ON elements during the transition time. Although the colors are mixed in the transition time, if an element were to be turned ON during all three transition times, the overall color mix added to the pixel is white. This gives that pixel an intensity boost that may be necessary for improved image quality.

A method for determining which elements need to be turned ON, and the process for accomplishing it are discussion in more detail in U.S. Pat. No. 5,592,188, incorporated by reference herein. This method, as an example, and others similar to it do not have any transition time between the sequences, making the use of a transition time difficult and more complicated.

Second, there are display systems using SLMs that do not use color-sequential light. These types of systems typically use one device per color, one each for red, green and blue. There is no transition time between colors. The input for these systems usually enters in a frame format, where each frame is followed by another frame of data until the system is turned off.

In this example, the sequences currently exist independently between frames. The transition time referred to above occurs between video frames of incoming data. However, use of the present invention allows an intensity increase if one sequence can meet the sequence for the subsequent frame seamlessly.

Thirdly, rapid color-switching sequential systems using alternate illumination systems do not require the transition time. An example of such a system would be an LED illumination system. The ability to connect the color sequences together will make these systems more effective in producing quality images.

Figure 3:
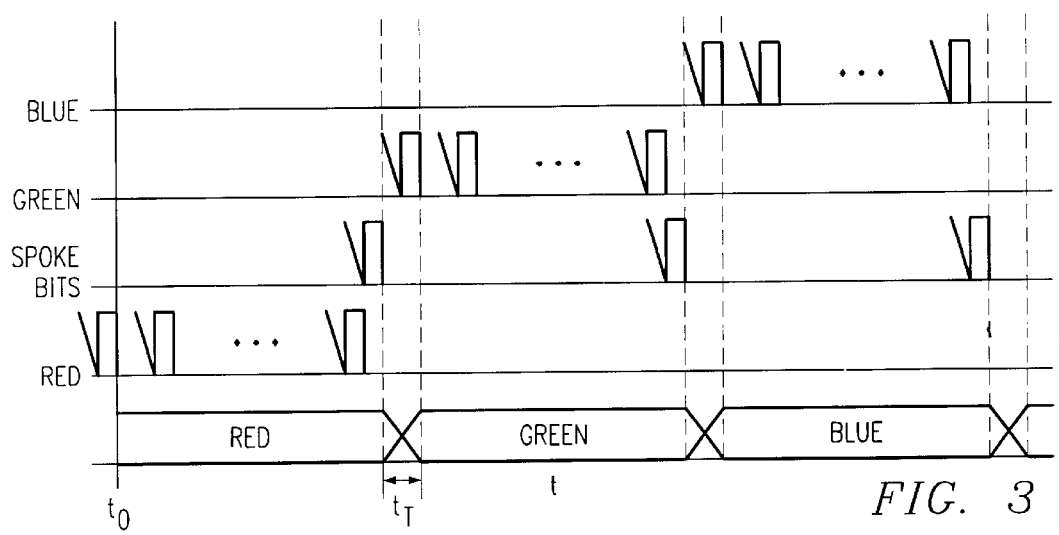
FIG. 3 is a timing diagram showing one embodiment of the invention.

In accordance with the present invention, FIG. 3 shows one timing diagram using non-terminated PWM sequences. The RED line shows a progression of pulses as in the prior art example of FIG. 2. However, at the end of the RED sequence there is no clearing reset pulse. The SPOKE BIT line shows that the first bit of the SPOKE BIT sequence is loaded during the display of the last bit of the previous sequence, which in this case is the RED sequence. The reset pulse at the beginning of the SPOKE BIT sequence acts as the clearing reset pulse for the previous sequence. The GREEN line shows that the first bit of the GREEN sequence is loaded during the display of the last bit of its previous sequence, which in this case is the SPOKE BIT. The reset pulse at the beginning of the GREEN sequence acts as the clearing reset pulse for the previous sequence. The same thing occurs at the end of the GREEN sequence and beginning of the BLUE sequence.

For a color-sequential system such as that used in the example of FIG. 2, it must be noted that the transition time, $t_T$, still has the same length of time. The use of spoke bits during the transition time is assumed in FIG. 3. If no bits were used to boost the overall white component of parts of the image, the device would have to be reset as before. Other possibilities for extra bits during the transition are possible. This example requires that some bits be loaded during the transition time. As mentioned previously, this assumes a color sequential system that does not perform rapid color switching. However, this invention applies to rapid color-switching systems as will be discussed further.

The sequence for any given color or frame relies upon the previous sequence to load its first bit and to reset the device on the appropriate division, such as a color or frame boundary. The bits displayed from the previous sequence 'hang' without a terminating pulse until the next sequence is started.

This approach solves all of the previously mentioned problems, as well as allowing more flexibility for application of other methods for the transition times. The sequences that use spoke bits merely insert those bits at the end of each sequence. The hanging bits for non-color sequential systems merely hang until the next frame of data is started. It eliminates the need for long transition times, making rapid color-switching systems less complex.

Figure 4:
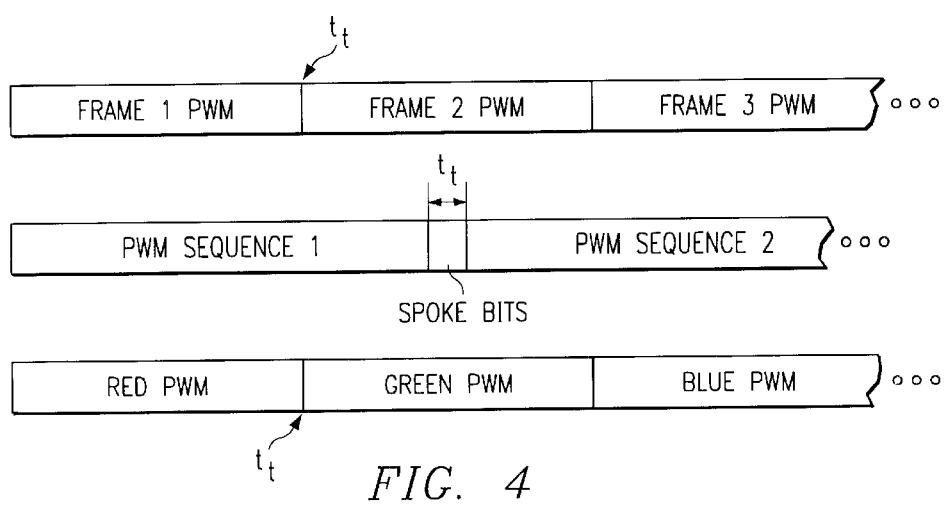
FIG. 4 is a block diagram of two different series of PWM sequence, in accordance with the invention.

These results are shown in block diagram form in FIG. 4. The top sequences show the application of the invention to a non-color sequential system. The transition time, $t_T$, during which the bits are hanging is minimal as the next frame of data comes in.

The bottom sequence shows a rapid color-switching progression. The transition time is similar to the non-color sequential system. The transition time is again minimal, but the transition time is between colors, rather than frame of data as in the non-color sequential system.

The middle sequence shows the color-sequential progression. The PWM sequences would typically be for different colors. The transition time, $t_T$, would be used for the spoke bits. The spoke bits would only hang at the far right boundary of the transition time since they load and display during the transition time.

In this manner, the invention can be applied to any system that uses PWM sequences, whether color transitions, frame boundaries or any other type of division divides them. It can be applied to systems having more or fewer color wheel division of any color. The only requirement is that the system must use PWM sequences.

Thus, although there has been described to this point a particular embodiment for a method for non-terminating PWM sequences, it is not intended that such specific references be considered as limitations upon the scope of this invention except in-so-far as set forth in the following claims.

What is claimed is:

1. A method of displaying image data using a spatial light modulator, the method comprising:

establishing an interval between a first division point and a second division point;

receiving a word of image data for each pixel of an image, each word comp of at least two data bits each said data bit having a significance;

for each said data bit:

loading said data bit into a said spatial light modulator; and resetting said spatial light modulator to respond to said loaded data bit to begin a display period of said loaded data bit and to end a display period of a previously loaded data bit;

wherein all of said data bits are displayed during said interval, said display period for each said data bit determined by said significance of said data bit except for said display period of a last data bit in said word, which display period is terminated at said second division point such that said display period of said last data bit is not equal to a period determined by the significance of said last display bit.

2. The method of claim 1, said establishing an interval between a first division point and a second division point comprising:

establishing an interval between a first division point defined by a color switching boundary of a color wheel and a second division point defined by a color switching boundary of a color wheel.

3. The method of claim 2, comprising:

displaying spoke bits during said color switching boundary of said color wheel.

4. The method of claim 1, said establishing an interval between a first division point and a second division point comprising:

establishing an interval between a first division point defined by an image frame boundary and a second division point defined by an image frame boundary.

5. The method of claim 1, said establishing an interval between a first division point and a second division point comprising:

establishing an interval between a first division point defined by a color switching boundary and a second division point defined by a color switching boundary.

6. The method of claim 1, said establishing an interval between a first division point and a second division point comprising:

establishing an interval between a first division point defined by a switching LED illumination system and a second division point defined by said switching LED illumination system.

* * * * *